ns appear.

UNITED STATES PATENT OFFICE 2,366,943

ASPHALT MODIFIED ADHESIVE

Robert Holland Treadway, Decatur, Ill., assignor to A. E. Staley Manufacturing Company, Decatur, Ill., a corporation of Delaware No Drawing. Application June 14, 1941, Serial No. 398,103

4 Claims. (Cl. 106—212)

This invention relates to improvements in adhesives and, more particularly, it relates to asphalt modified adhesive compositions adapted to effect a firm and secure bond between laminated structures such as, for example, asphalt impregnated corrugated or fiber board and plane surfaced liner stock.

Corrugated board, in which a core of corrugated material is adhesively affixed to a single liner or between two or more liners, has been in use for a long time and it has been conventional adhesively to affix the various laminations thereof with adhesive compositions of starch as well as adhesive compositions of silicate. There has been developed, however, a corrugated material which is impregnated with asphalt and various attempts have been made adhesively to affix such corrugated impregnated asphalt material between the usual fiber board liners by means of ordinary starch or silicate adhesive compositions but without practical or satisfactory results.

The particular kind of paper giving rise to the difficulties and now being sold in the open market contains an amount of asphalt which, because of its adhesive-repellant character, has confronted the adhesive suppliers and the box board manufacturers with a unique problem. The asphalt impregnated paper is particularly desirable and useful as a corrugating medium. One of the chief difficulties encountered in combining this asphalt corrugating medium when using a conventional adhesive is that of wetting and penetrating the asphalt paper. Attempts to solve the problem using suggested reagents, solvents, wetting agents, etc., with present day starch adhesives and silicate adhesives have been equally unsuccessful.

Generally it is an object of the present invention to provide an adhesive composiiton which will secure a firm bond between a plurality of materials, one or more of which have been treated with a substance having certain of the characteristics of the composition.

A principal object of the invention is the provision of an asphalt modified adhesive composition which will effect a firm bond between a plurality of structures, one or more of which have been treated with materials advantageous in themselves but not conducive to adhesive treatment with known adhesives.

More specifically it is an object of the present invention to provide a product containing a combination of an adhesive composition of either starch or silicate, but preferably starch, and an asphalt emulsion which will securely bond together asphalt impregnated corrugated fiber board with conventional liner materials.

Further objects of the invention are to provide an asphalt modified adhesive for application to asphalt impregnated fiber board which has improved spreading qualities, suitable penetrating and wetting powers, quicker setting and bonding properties as well as stronger and more fully matured bonding characteristics and also more tenacious adhesive qualiites.

Other objects of the invention will in part be obvious and will in part appear hereinafter.

The invention accordingly comprises a composition of matter possessing the characteristics, properties and the relation of constituents which will be exemplified in the composition hereinafter described and the scope of the application which will be indicated in the claims.

The asphalt modified adhesives hereinafter described are particularly advantageous when used in conjunction with the manufacture of asphalt impregnated corrugated board but it is to be understood that its use is also contemplated with structures other than a corrugated medium.

Although, until now, asphalt impregnated corrugated board has not been used to any appreciable extent because of the difficulties encountered in adhesively affixing the same to liner stock in building laminated structures it has many definite advantages. For example, impregnation with asphalt materially increases the strength of the board. Another advantage resides in the fact that asphalt corrugating medium imparts decided water and moisture resisting qualities to combined fiber board. Because of these and other features the asphalt board which can now successfully be simultaneously laminated by means of the asphalt modified adhesive of the present invention will satisfy the demand for such shipping containers and should meet with equal success in the field of wall board and plaster board manufacture in low cost housing projects.

Asphalt modified starch adhesives possess far-reaching advantages over conventional starch adhesives used in the fabrication of box board. The ordinary starch composition which works quite successfully in production of ordinary paper board at high operating speeds can be applied to asphalt impregnated paper, if at all, only with great difficulty and then without assurance of adhesive permanence. There is a particular reason for this in addition to the natural adhesion-repellant quality inherent in the asphalt. It should be noted that as a result of the application of heat both prior to the corrugating operation upon the flat sheet and during the formation of the flutes and bonding of the corrugating medium to flat liner paper, the asphalt with which the corrugated paper has been impregnated has a tendency to migrate from the interior to the surfaces of the sheet. That is, there is a tendency for the asphalt material to drift toward and pile up at the apex of the corrugated tip. This concenration of asphalt at the surfaces results in an even greater water repellancy than is found in the original flat sheet containing a uniform distribution of asphalt. If even a temporary bond is formed at all with unmodified starch adhesives, machine speed must be greatly reduced even when reagents, such as urea, are frequently added. This adds considerably to the cost and results in an unsatisfactory product.

I have found that by the addition of a small percentage of a suitable asphalt emulsion to an ordinary box board adhesive composition that an excellent permanent bond is made possible at much higher operating speeds than heretofore possible by other known methods. The formation of strong bonds at high operating speed is accomplished as the result of improved spreading of adhesive along the glue line, improved wetting characteristics and faster penetration into the asphalt paper.

After the application and drying of the starch modified adhesive composition the presence of the asphalt, particularly when it has been built up at the corrugating tips, imparts greater water resistance to the glue line than could be obtained in any conventional starch applied construction. This is of great importance with all types of paper board when improved water resistance is desired.

Tests have demonstrated that the addition of small amounts of a suitable asphalt emulsion to conventionally used adhesive compositions such as, for example, those disclosed in the Bauer Patents Nos. 2,051,025, 2,212,557 and 1,969,659 gave much improved and superior spreading, penetrating and permanent adhesion over such starch paste alone when used and resulted in a faster setting bond as well as a stronger and more fully matured bond.

Starch ply board adhesives do not give successful results from the standpoint of the present invention in combining with asphalt impregnated paper and as above indicated many attempts have been made by other means to utilize the conventional starch adhesives as well as the silicates in order to bring about a successful solution to the problem.

The addition of hydrocarbon solvents to starch adhesives resulted in no improvement in performance with the asphalt impregnated paper. The addition of wetting agents gave no satisfactory improvement. Equally unsuccessful was the addition of a reagent to lower the gelatinization temperature of the suspended starch with a Bauer adhesive and attempts at increasing the adhesive power, such as by the addition of urea, did not give successful results. It has also been found that the application of asphalt alone as well as starch by itself has adhesive qualities which are no more desirable than the ordinary conventional starch adhesives. Such bond as is brought about by means of the asphalt alone is one that is very brittle, particularly when the board is cold.

The addition of asphalt emulsions to starch as well as silicate adhesive compositions in accordance with the principles of the present invention enables asphalt impregnated paper to be combined with liner stock without difficulty.

The asphalt modified starch adhesive product of the present invention can be prepared by adding an asphalt emulsion to a starch adhesive composition, such as that described for example in the Bauer patents. Any attempt to mix pure asphalt with the starch paste involves considerable difficulty and it has been found and it is preferred that the asphalt be added as a fluid emulsion as it is more readily mixed into the starch paste to give a stable mixture. The presence of the asphalt emulsions in reasonably small percentage is surprisingly effective in giving a bond formation with asphalt impregnated paper with liner stock. I have found that 0.5 per cent to 10 per cent solids content of an aqueous asphalt emulsion gives very desirable results. However, approximately 1 per cent to 2 per cent solids content of asphalt emulsion based on the liquid composition gives the best results. I have found that larger amounts of asphalt will give better wetting and penetrating action with the asphalt impregnated paper but at the expense of adhesion partly because of greater dilution of the starch adhesive component.

*Example of asphalt modified starch adhesive composition*

To 98 parts by weight of a starch corrugating adhesive consisting of 4 per cent gelatinized oxidized corn starch, 15 per cent ungelatinized corn starch, 0.5 per cent borax, 0.5 per cent caustic soda, 0.17 per cent sulfonated castor oil and the remainder of water there was added 2 parts by weight of an asphalt emulsion. The asphalt emulsion consisted of 58 per cent asphalt emulsified in an aqueous alkaline medium containing approximately 0.2 per cent sodium hydroxide and 2 per cent soybean flour (based on the total weight of the emulsion), as stabilizing agent.

The above composition after thorough mixing was applied to the flutes of asphalt impregnated paper of single-faced corrugated board and tested. It was observed that the adhesive readily wetted the asphalt impregnated corrugating medium and spread thinly to give a uniform film. The double-faced liner was then applied and followed by the application of standardized heat and pressure. The freshly applied liner was then pulled back by an apparatus recording the force required to reopen the newly formed bonds with increasing time.

The identical starch adhesive without the 2 per cent asphalt emulsion added was tested by the same procedure for comparison. This composition was applied in a film form to the asphalt corrugating medium. Upon observation and comparison with the asphalt modified starch adhesive composition it was noted that the setting rate was slower as evidenced by lesser force required to rupture the bonds and also that the bonds were weaker as evidenced by far less fiber being pulled as the joints were severed.

The asphalt modified starch was applied under practical conditions on a commercial corrugating machine and in this trial 2 per cent of a 62 per cent solids asphalt emulsion was mixed, for example, with a 98 per cent starch adhesive composition and used to combine the asphalt impregnated board. Maximum operating speed on the corrugating machine was found to be 75 per cent greater than the previous upper limit without asphalt emulsion addition in attempts to bring about a permanent adhesion with the conventional type of starch adhesive. When compared with a test involving the use of urea (10 per cent based on solids weight) as an addition agent to ordinary starch adhesive composition in order to obtain a permanent bond with asphalt impregnated paper, it was found upon comparison that the maximum operating speed was 175 feet per minute with the asphalt modified starch as compared with 90 to 100 feet per minute using urea. This represents a considerable saving in adhesive cost as well as in production time to the board maker.

*Example of asphalt modified silicate adhesive composition*

In the following example sodium silicate composition of 47° Baumé gravity at 78° F. was mixed with an asphalt emulsion of a composition similar to that previously given with respect to the asphalt modified starch example. 360 parts of the silicate solution were placed in a container and agitated at a rapid rate. 40 parts of the asphalt emulsion were then poured slowly into the silicate to form a smooth mixture consisting of 90 per cent sodium silicate solution and 10 per cent asphalt emulsion.

The silicate asphalt mixture was similarly compared with the unmodified silicate as to setting rate and ability to form strong bonds. The adhesives thus formed were applied in turn to strips of single faced corrugated board having an asphalt impregnated corrugating medium. It was observed that the silicate asphalt adhesive applied much better than straight silicate adhesive. Following mechanical application of the adhesive in films along the corrugation flutes, kraft liner paper was applied and bonded with standardized heat and pressure. The silicate asphalt composition set faster and formed stronger and more permanent bonds than unmodified silicate as demonstrated by the pressure recorded measuring force required to rupture the freshly formed bonds.

There are a number of satisfactory asphalt emulsions on the market and most all of them can be utilized if combined with starch or silicate adhesives as herein specified and when used in acocrdance with the principles of the present invention.

It is also to be understood that the present invention contemplates the use of asphalt emulsions to modify acid starch adhesives as well as alkaline starch adhesives as given in the preceding example. This includes mixtures of raw and gelatinized or pure gelatinized starch, as well as modified starches. The percentages of asphalt emulsion to be used in conjunction therewith, as well as that used in previous examples, should be understood to relate to solids content.

It will thus be seen that the objects hereinbefore set forth may be readily and efficiently attained and since certain changes may be made in the above composition and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Particularly, it is to be understood that in said claims ingredients or compounds recited in the singular are intended to include compatible mixtures of such ingredients wherever the sense permits.

What I claim as new and desire to secure by Letters Patent is:

1. A laminating medium for asphalt impregnated plyboard, comprising in combination, a starch adhesive composition consisting of approximately 15 per cent of ungelatinized corn starch, 4 per cent gelatinized oxidized corn starch, 0.5 per cent borax, 0.5 per cent caustic soda and 0.17 per cent sulfonated castor oil, and an asphalt in emulsified form in the proportion as represented by about 0.5 to 10 per cent of an aqueous asphalt emulsion containing approximately 58 to 62 per cent of asphalt.

2. A laminating medium for asphalt impregnated plyboard, comprising in combination, an adhesive composition of ungelatinized starch suspended in a gelatinuous carrier, and an asphalt in emulsified form in the proportion as represented by about 0.5 to 10 per cent of an aqueous asphalt emulsion containing approximately 58 to 62 per cent of asphalt.

3. A laminating medium for asphalt impregnated plyboard, comprising in combination, an adhesive composition of ungelatinized starch suspended in a non-amylaceous carrier, and an asphalt in emulsified form in the proportion as represented by about 0.5 to 10 per cent of an aqueous asphalt emulsion containing approximately 58 to 62 per cent of asphalt.

4. A laminating medium for asphalt impregnated plyboard comprising in combination, approximately 98 parts by weight of a starch adhesive composition and 2 parts by weight of an aqueous asphalt emulsion having a solids asphalt content of approximately 58 per cent to 62 per cent.

ROBERT HOLLAND TREADWAY.